United States Patent
Takano et al.

(10) Patent No.: US 10,594,194 B2
(45) Date of Patent: Mar. 17, 2020

(54) ROTOR AND ROTARY ELECTRIC MACHINE

(71) Applicant: FANUC CORPORATION, Yamanashi (JP)

(72) Inventors: Shinobu Takano, Yamanashi (JP); Takafumi Kajiya, Yamanashi (JP); Hisashi Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 35 days.

(21) Appl. No.: 15/993,693

(22) Filed: May 31, 2018

(65) Prior Publication Data

US 2019/0036430 A1     Jan. 31, 2019

(30) Foreign Application Priority Data

Jul. 26, 2017   (JP) .................................. 2017-144557

(51) Int. Cl.
| | |
|---|---|
| *H02K 1/27* | (2006.01) |
| *H02K 1/28* | (2006.01) |
| *H02K 15/03* | (2006.01) |
| *H02K 21/14* | (2006.01) |

(52) U.S. Cl.
CPC ............. *H02K 15/03* (2013.01); *H02K 1/278* (2013.01); *H02K 1/28* (2013.01); *H02K 21/14* (2013.01)

(58) Field of Classification Search
CPC .................................. H02K 1/28; H02K 1/30
USPC ........................... 310/156.01, 156.12, 156.31
See application file for complete search history.

(56) References Cited

U.S. PATENT DOCUMENTS

| | | | |
|---|---|---|---|
| 2016/0111926 A1* | 4/2016 | Arimatsu | H02K 1/2706 310/156.31 |
| 2016/0315514 A1 | 10/2016 | Eckert et al. | |

FOREIGN PATENT DOCUMENTS

| | | | | |
|---|---|---|---|---|
| JP | H11-089142 A | | 3/1999 | |
| JP | 2010-057233 A | | 3/2010 | |
| JP | 2010057233 A | * | 3/2010 | ............. H02K 1/278 |
| JP | 2016-082773 A | | 5/2016 | |

OTHER PUBLICATIONS

Machine Translation, Okitsu, JP-2010057233-A, Mar. 2010. (Year: 2010).*

An Office Action mailed by the Japanese Patent Office dated Feb. 5, 2019, which corresponds to Japanese Patent Application No. 2017-144557 and is related to U.S. Appl. No. 15/993,693; with English translation.

* cited by examiner

*Primary Examiner* — Thomas Truong
(74) *Attorney, Agent, or Firm* — Studebaker & Brackett PC

(57) ABSTRACT

A rotor includes a rotary member; a plurality of permanent magnets disposed in an outer circumference of the rotary member; a holding member that is provided on an outer circumferential surface of the permanent magnets to hold the permanent magnets, the holding member having a cylindrical shape formed of a fiber reinforced plastic; and cover members that cover at least both end portions of a longitudinal direction D1 of the holding member.

4 Claims, 4 Drawing Sheets

ROTOR AND ROTARY ELECTRIC MACHINE

This application is based on and claims the benefit of priority from Japanese Patent Application No. 2017-144557, filed on Jul. 26, 2017, the content of which is incorporated herein by reference.

BACKGROUND OF THE INVENTION

Field of the Invention

The present invention relates to a rotor, and a rotary electric machine including the rotor.

Related Art

As one type of a motor in which a permanent magnet is used in a rotor, a motor of a surface permanent magnet (SPM) type in which a permanent magnet is disposed in an outer circumference of a rotary member (a sleeve, a rotary axis, or the like) is known. In this motor of the SPM type, a holding member is provided so as to cover an outer circumference of the permanent magnet so that the permanent magnet is prevented from falling off from the rotor due to the centrifugal force at the time of high speed rotating. As the holding member, a fiber reinforced plastic (FRP), particularly, a carbon fiber reinforced plastic (hereinafter, also referred to as a "CFRP") is widely used, since the fiber reinforced plastic has high strength, light weight, and other reasons. A motor including a holding member formed of the CFRP has been suggested (for example, see Patent Document 1).

Patent Document 1: Japanese Unexamined Patent Application, Publication No. H11-89142

SUMMARY OF THE INVENTION

The holding member is shaped by, for example, winding a fiber bundle of the CFRP formed to be a tape shape to a tubular jig, together with a resin. The holding member drawn from the jig is cut in accordance with a length of the rotor. In the holding member mounted to the rotor, when a cut piece of the fiber is exposed from a cutting surface of the CFRP, the cut piece may be peeled off by wind pressure generated by rotation of the rotor, and the peeling off of the fiber may spread to the entire holding member from the peeled off portion as a starting point. Such phenomenon may be occurred similarly also when the holding member is formed by spirally winding the fiber of the CFRP to the outer circumference of the permanent magnet, and applying a resin to the surface, or the like.

An object of the present invention is to provide: a rotor in which a fiber of a fiber reinforced plastic composing a holding member can be prevented from being peeled off by window pressure; and a rotary electric machine.

(1) The present invention relates to a rotor (for example, a rotor 30 described later) including: a rotary member (for example, a rotary axis 32 described later); a plurality of permanent magnets (for example, permanent magnets 312 described later) disposed in an outer circumference of the rotary member; a holding member (for example, a holding member 313 described later) that is provided in an outer circumferential side of the permanent magnets and holds the permanent magnets, the holding member having a cylindrical shape formed of a fiber reinforced plastic; and cover members (for example, cover members 314 described later) that cover at least both end portions of a longitudinal direction (for example, a longitudinal direction D1 described later) of the holding member.

(2) In the rotor of (1), a longitudinal direction (for example, a longitudinal direction D2 described later) of a fiber included in the fiber reinforced plastic may be configured to cross with the longitudinal direction of the holding member.

(3) In the rotor of (1) or (2), the cover members may be formed of a metal or a resin having oil resistance.

(4) The present invention relates to a rotary electric machine (for example, a motor 1 described later) including the rotor of any of (1) to (3), and a stator (for example, a stator 20 described later) provided in an outer circumferential side of the rotor.

According to the present invention, a rotor in which a fiber of a fiber reinforced plastic composing a holding member can be prevented from being peeled off by window pressure, and a rotary electric machine can be provided.

DETAILED DESCRIPTION OF THE INVENTION

Figure 1:
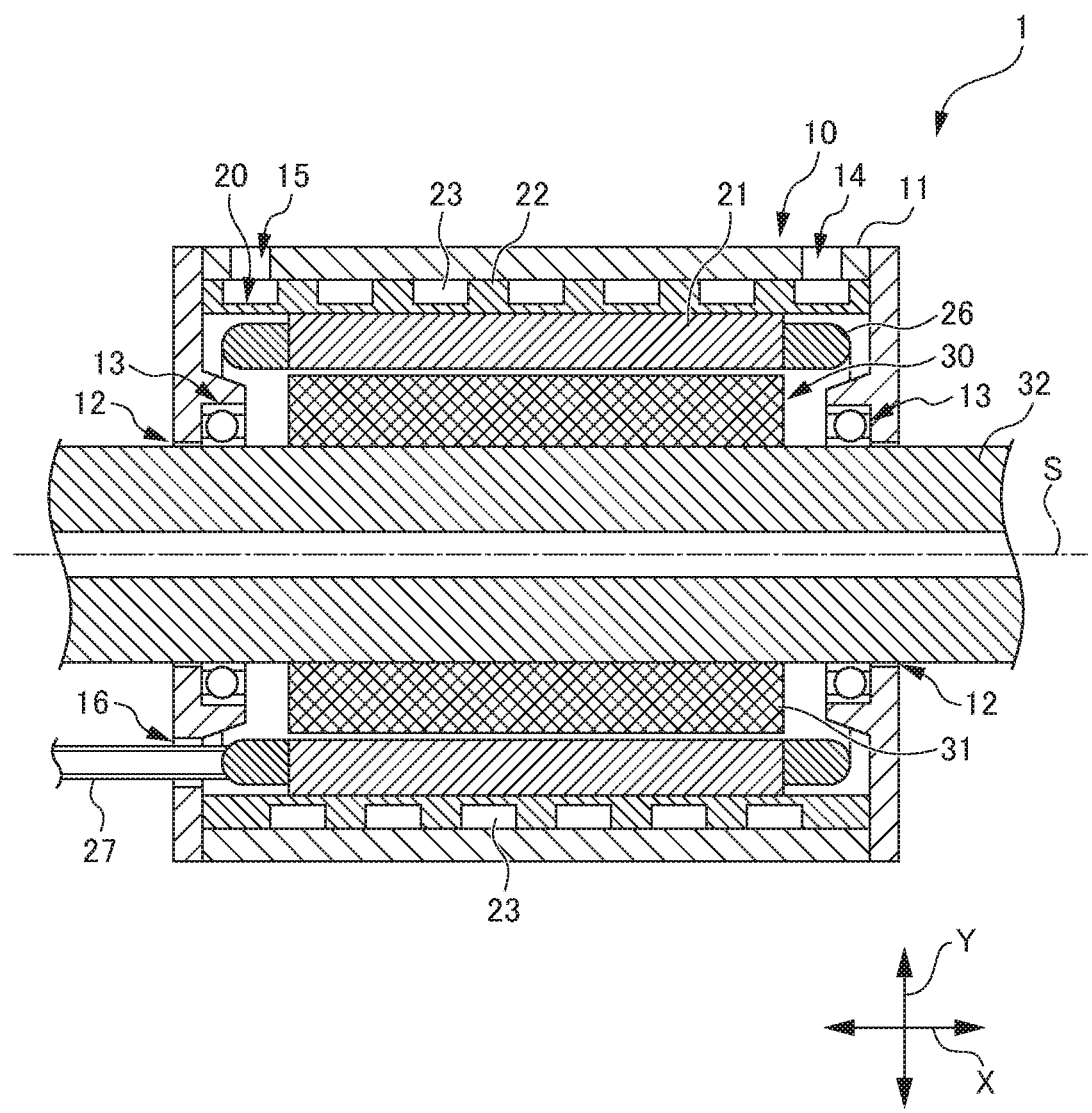
FIG. 1 is a cross sectional view showing a configuration of a motor 1 in an embodiment.

Embodiments of the present invention will be described below. All drawings attached to this specification are schematic views, and a shape, scale, a vertical and horizontal dimensional ratio, and the like of each portion are changed or exaggerated from actual ones inconsideration of easiness of understanding, and the like. In the drawings, hatching that shows a cross section of a member is omitted as appropriate.

In this specification, a shape, a geometrical condition, and terms specifying degrees thereof, for example, terms such as "parallel" and "direction", include, in addition to a exact meaning of the term, a range of degrees that can be considered to be almost parallel, and a range that can be considered to be generally the direction. In this specification, a parallel direction to a longitudinal direction of a rotor 30 (a rotor body 31) is an X direction, and an orthogonal direction to the X direction is a Y direction.

First, a motor 1 serving as a rotary electric machine including a rotor 30 (described later) of the present embodiment will be described. FIG. 1 is a cross sectional view showing a configuration of the motor 1 in the present embodiment. A configuration of the motor 1 shown in FIG. 1 is an example, and, the motor 1 may have any configuration in which the rotor 30 of the present embodiment can be applied.

As shown in FIG. 1, the motor 1 includes a frame 10, a stator 20, a rotor 30, and a bearing 13. The frame 10 is an exterior member of the motor 1, and includes a frame body 11 and an axis hole 12.

The frame body 11 is a casing that encloses and holds the stator 20. The frame body 11 holds the rotor 30 via the bearing 13. The frame body 11 includes a supply port 14, a discharge port 15, and a hole portion 16. The supply port 14 is an opening for supplying refrigerant to a flow path 23 of stator frame 22, and is connected to a supply piping (not shown) of the refrigerant. The discharge port 15 is an opening for discharging the refrigerant flowing through the flow path 23, and is connected to a discharge piping (not shown) of the refrigerant. The hole portion 16 is an opening for passing through a power line 27 drawn from the stator 20. The axis hole 12 is an opening through which a rotary axis 32 (described later) passes.

The stator 20 is a composite member forming a rotary magnetic field for rotating the rotor 30. The stator 20 is entirely formed to be a cylindrical shape, and is fixed to an inside of the frame 10. The stator 20 includes an iron core 21, and the stator frame 22.

The iron core 21 is a member in which a winding 26 can be disposed in an inside. The iron core 21 is formed to be a cylindrical shape, and is disposed in an inside of the stator frame 22. A plurality of grooves (not shown) are formed in an inside surface of the iron core 21, and the winding 26 is disposed in these grooves. Part of the winding 26 projects from both end portions of the iron core 21 in an axis direction of the iron core 21. For example, the iron core 21 is manufactured by obtaining a laminate by laminating a plurality of thin plates such as an electromagnetic steel plate, and integrating the laminate by bonding, caulking, or the like.

The stator frame 22 is a member that holds the iron core 21 in an inside of the stator frame 22. The stator frame 22 is formed to be a cylindrical shape, and is disposed in an outside of the stator 20. The iron core 21 is strongly joined to the stator frame 22 for receiving a reaction force generated by a torque of the rotor 30. As shown in FIG. 1, the stator frame 22 of the present embodiment includes the flow path 23 for cooling heat transmitted from the iron core 21, in an outside surface of the stator frame 22. The flow path 23 is a single or multi spiral groove formed in the outside surface of the stator frame 22. The refrigerant (not shown) supplied from the supply port 14 of the frame body 11 (the frame 10) flows through the flow path 23 so as to be spirally along the outside surface of the stator frame 22, and then is discharged from the discharge port 15 of the frame body 11 to the outside.

The power line 27 electrically connected with the winding 26 is drawn from the iron core 21 of the stator 20. The power line 27 is connected to a power supply device installed in an outside of the motor 1 (not shown). In operation of the motor 1, for example, a rotary magnetic field for rotating the rotor 30 is formed by supplying a three-phase alternating current to the iron core 21.

The rotor 30 is a part that rotates by magnetic interaction with the rotary magnetic field formed by the stator 20. The rotor 30 is provided in an inner circumferential side of the stator 20. The rotor 30 includes rotor body 31, and a rotary axis 32.

The rotor body 31 is a portion that generates a rotary force by a rotary magnetic field formed in the stator 20. As described later, the rotor body 31 includes a sleeve 311, permanent magnets 312, a holding member 313, cover members 314 (see FIG. 2, and the like), and the like. A configuration of the rotor body 31 will be described later in detail.

The rotary axis 32 is a member that supports the rotor body 31. The rotary axis 32 is inserted so as to pass through the axis center of the rotor body 31, and is fixed to the rotor body 31. A pair of bearings 13 is fit to the rotary axis 32. The bearings 13 are members that rotatably support the rotary axis 32, and are provided in the frame body 11. The rotary axis 32 is rotatably supported around a rotary axis line S by the frame body 11 and the bearings 13. The rotary axis 32 passes through the axis hole 12, and, for example, is connected to a cutting tool, a power transmission mechanism installed in the outside, a deceleration mechanism, or the like (all of them are not shown).

In the motor 1 shown in FIG. 1, when a three-phase alternating current is supplied to the stator 20 (the iron core 21), a rotary force is generated in the rotor body 31 by magnetic interaction between the stator 20 and the rotor 30 in which a rotary magnetic field is formed, and the rotary force is output to the outside via the rotary axis 32. In the present embodiment, as the motor 1, a synchronous motor of the SPM type described above is described. However, for example, the motor 1 may be a synchronous motor of an interior permanent magnet (IPM) type. In that case, the cover tube is mounted to the outside of an electromagnetic steel plate in which the permanent magnets are embedded.

Figure 2:
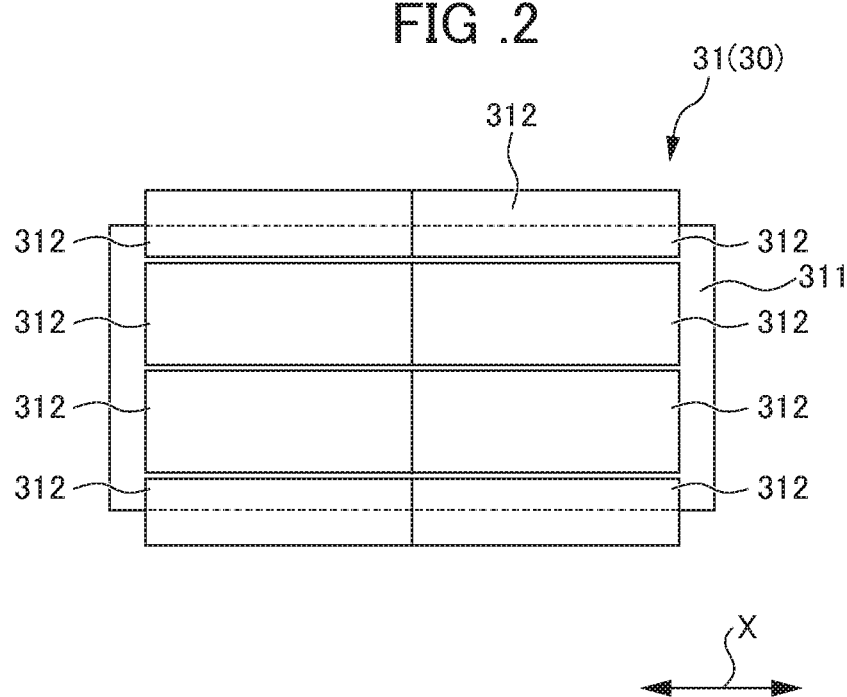
FIG. 2 a side view showing a rotor body 31 to which permanent magnets 312 are attached.
Figure 3:
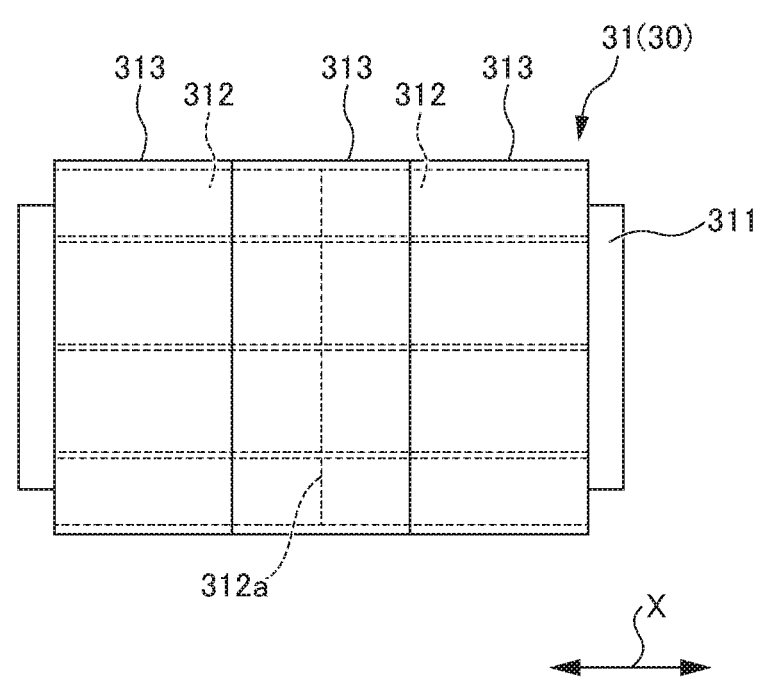
FIG. 3 is a side view showing the rotary body 31 to which a holding member 313 is attached.

Next, a configuration of the rotor body 31 will be described. FIG. 2 is a side view showing the rotor body 31 to which the permanent magnets 312 are attached. FIG. 3 is a side view showing the rotor body 31 to which the holding member 313 is attached. Both FIG. 2 and FIG. 3 shown a state before the rotor body 31 has been fit to the rotary axis 32.

As shown in FIG. 2, the rotor body 31 includes the sleeve 311, and the permanent magnets 312, as basic configurations. The sleeve 311 is a cylindrical member to which the plurality of permanent magnets 312 are attached, and is provided in between the rotary axis 32 and the plurality of permanent magnets 312. The plurality of permanent magnets 312 are arranged along a circumferential direction of the sleeve 311. The sleeve 311 is formed of, for example, a magnetic material such as a carbon steel. The rotor body 31 having the sleeve 311 in an inner circumferential side is fit to the outer circumference of the rotary axis 32 (see FIG. 1) by, for example, interference fit.

The permanent magnets 312 are members that generate a magnetic field, and are provided in eight rows along the circumferential direction in the outer circumferential surface of the sleeve 311 as shown in FIG. 2 (only four rows in a front side are illustrated in FIG. 2). In the eight rows of the permanent magnets 312, the permanent magnets 312 for an N pole and the permanent magnets 312 for an S pole are alternately disposed in the circumferential direction of the sleeve 311. The permanent magnets 312 are adhered to the outer circumferential surface of the sleeve 311 by, for example, an adhesive. That is, the permanent magnets 312 are disposed in the outer circumferential side of the rotary axis 32. The permanent magnets 312 in each row are divided into two along a longitudinal direction (X direction) of the rotor 30. The permanent magnets 312 may be divided into three or more along the longitudinal direction of the rotor 30, or may not be divided.

As shown in FIG. 3, the holding member 313 is a cylindrical member for holding the plurality of permanent magnets 312. The holding member 313 is provided in the outer circumferential surface of the permanent magnet 312. The permanent magnets 312 can be prevented from falling off from the rotor 30 due to the centrifugal force generated by rotation of the rotor 30 by providing the holding member 313 to the outer circumferential surfaces of the permanent magnets 312. The holding member 313 may be adhered to the outer circumferential surfaces of the permanent magnets 312 via an adhesive layer, other members, or the like. That is, the holding member 313 is provided in the outer circumferential surface side of the permanent magnets 312.

The holding member 313 is divided into three along the longitudinal direction (X direction) of the rotor 30. Among the holding members 313 divided into three, the holding member 313 disposed in the center covers a connection portion 312a of the permanent magnets 312 divided into two in each row. The holding member 313 is not limited to dividing into three as the present embodiment, and, for example, may be a non-divided shape.

The holding member 313 can be shaped by, for example, winding a fiber bundle of the CFRP formed to be a tape shape onto a cylindrical jig, together with a resin. As a material forming the holding member 313, other than the CFRP, for example, a fiber reinforced plastic including a material having a high specific strength, such as a glass fiber, an aramid fiber, a silicon carbide fiber, a boron fiber, a titanium alloy fiber, or the like can be used. The holding member 313 may be shaped by winding the fiber bundle impregnated in a resin onto a jig.

The holding member 313 is attached to the rotor 30 in a state of being extended to a predetermined diameter, and contracts to be fit with the rotor 30. Thereby, a reaction force that is enough to hold the permanent magnets 312 is applied toward the inside of a radial direction of the holding member 313, resisting the centrifugal force generated when the rotor 30 rotates. The inside of the radial direction refers to a direction of approaching the rotary axis line S (see FIG. 1) from the outside of the rotary axis 32.

Figure 4:
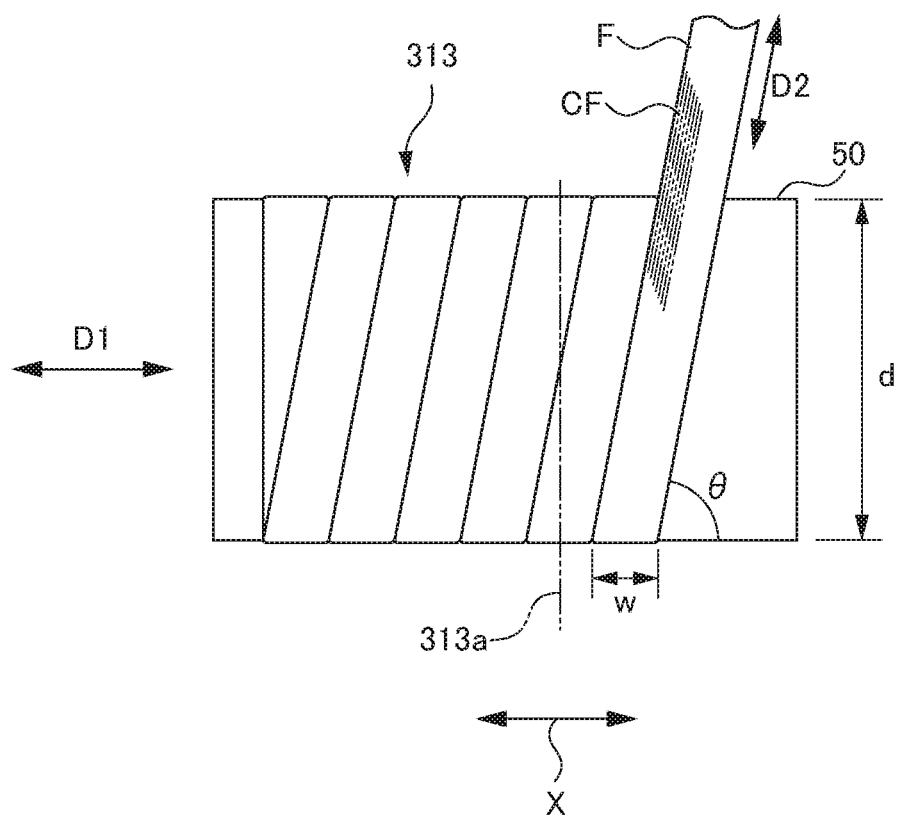
FIG. 4 is a conceptual diagram showing an orientation direction of a carbon fiber CF included in a fiber F wound around a jig 50.

An orientation direction of the carbon fiber CF included in a fiber bundle F of the holding member 313 will be described. FIG. 4 is a conceptual diagram showing the orientation direction of the carbon fiber CF included in the fiber bundle F wound around a jig 50. As shown in FIG. 4, a longitudinal direction D2 of the fiber bundle F and the orientation direction of the carbon fiber CF included in the fiber bundle F are described as substantially parallel. FIG. 4 shows a state in which the fiber bundle F is wound around the cylindrical jig 50. In FIG. 4, a longitudinal direction D1 (a left and right direction in the drawing) of the holding member 313 is a parallel direction with the longitudinal direction (X direction) of the rotor body 31, when the holding member 313 after the shaping is mounted to the rotor body 31.

As shown in FIG. 4, in the holding member 313, the longitudinal direction D2 of the fiber bundle F (carbon fiber) obliquely crosses with the longitudinal direction D1 (X direction) of the holding member 313. Particularly, an angle θ in which the longitudinal direction D2 of the fiber bundle F crosses with the longitudinal direction D1 (X direction) of the holding member 313 is in a range of 0°<θ<180°. In an example shown in FIG. 4, the angle θ is determined by θ=tan$^{-1}$(d/(W/2)) when a width of the fiber bundle F is W, and a diameter of the jig 50 is d. The fiber bundle F may be wound around the jig 50 so that an end portion of a width direction partly overlaps, or may be wound around the jig 50 so that a gap is generated in between adjacent fiber bundles F.

When the longitudinal direction D2 of the fiber bundle F obliquely crosses with the longitudinal direction D1 (X direction) of the holding member 313, an elastic force in the longitudinal direction D2 of the fiber bundle F is applied in a crossing direction with the longitudinal direction D1 of the holding member 313. Thus, even when a force of a direction toward an outside of a radial direction of the rotor 30 is applied to the permanent magnets 312 due to the centrifugal force generated by rotation of the rotor 30, the permanent magnets 312 can be prevented from falling off from the rotor 30 due to an elastic force of the fiber bundle F (holding member 313). The outside of the radial direction refers to a direction apart from the rotary axis line S (see FIG. 1) of the rotary axis 32.

On the other hand, when the longitudinal direction D2 of the fiber bundle F obliquely crosses with the longitudinal direction D1 (X direction) of the holding member 313, a cut piece of the carbon fiber CF is exposed from an end portion of the holding member 313. That is, as shown in FIG. 4, a cut piece of the carbon fiber CF is exposed in an end portion 313a that is a cut surface of the holding member 313 when the holding member 313 is divided. In FIG. 4, the end portion 313a virtually shows an end portion that is a cut surface of the holding member 313 when the holding member 313 is divided. As described above, when a cut piece of the carbon fiber CF is exposed from an end portion of the holding member 313, the cut piece may be peeled off by wind pressure generated by rotation of the rotor 30, and the peeling off of the carbon fiber CF may spread to the entire holding member 313 from the peeled off portion as a starting point. Thus, cover members 314 described later are provided in the rotor body 31, in order to prevent peeling off of the cut piece of the carbon fiber CF.

Figure 5:
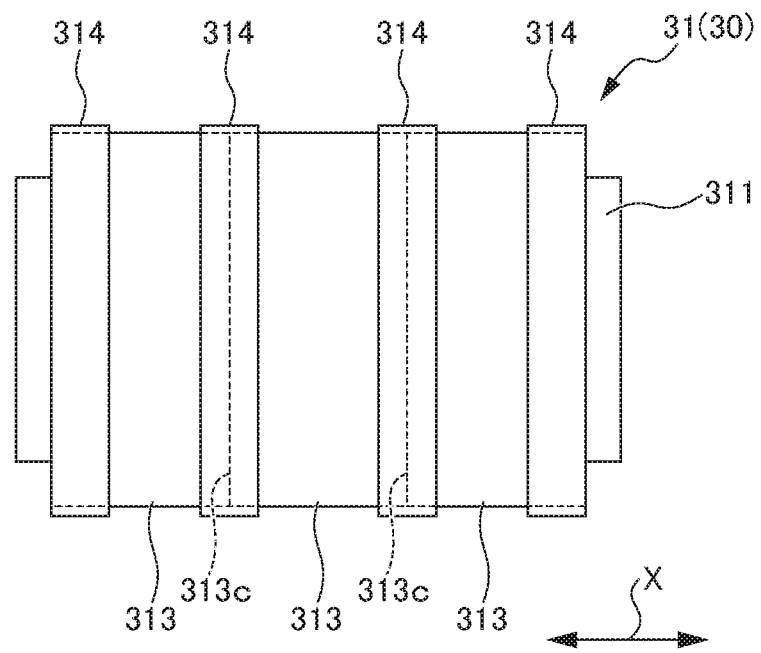
FIG. 5 is a side view showing the rotary body 31 to which cover members 314 are mounted.

Next, the configuration of the cover members 314 will be described. FIG. 5 is a side view showing the rotor body 31 to which the cover members 314 are mounted. FIG. 5 shows a state before the rotor body 31 is fit to the rotary axis 32, as similar to FIG. 2 and FIG. 3. As shown in FIG. 5, the cover members 314 are provided in four positions along the longitudinal direction D1 (X direction) of the holding member 313. Particularly, the cover members 314 are provided in each of both end portions (two positions) of the longitudinal direction (X direction) of the rotor body 31, and connection portions 313c (two positions) of the holding member 313 divided into three.

The cover members 314 are members for preventing peeling off or the cut piece or the carbon fiber CF. The cover members 314 of the present embodiment are composed of a metal ring. The holding member 313 in a mounted portion is covered by mounting the cover members 314 to a predetermined position of the rotor body 31. Thereby, peeling off of a cut piece of the carbon fiber CF due to wind pressure in that portion can be prevented.

In the holding member 313, there are cut surfaces of the holding member 313 when the cylindrical holding member 313 is cut, in both end portions of the longitudinal direction (X direction) of the rotor body 31, and the cut piece of the carbon fiber CF is exposed in that portion. Thus, the cover members 314 are mounted to both end portions (two positions) of the longitudinal direction of the rotor body 31, and thereby, peeling off of the cut piece of the carbon fiber CF exposed in that portion can be prevented.

In the holding member 313, the cut piece of the carbon fiber CF is exposed in the connection portion 313c of the holding member 313 divided into three. Thus, in the longitudinal direction of the rotor body 31, the cover members 314 are mounted to the connection portion 313c of the holding member 313 divided into three, and thereby, peeling off of the cut piece of the carbon fiber CF exposed in that portion can be prevented.

Next, a material, a shape, and the like of the cover members 314 will be described. In the motor 1, a portion of the bearings 13 (see FIG. 1) is lubricated by oil for supporting the rotary axis 32 that rotates at high speed. An inside of the motor 1 has a high temperature during operation, and oil is filled in mist. Under such environment, a resin material is easy to be affected by swelling due to oil, depending on a composition of the resin material. Thus, it is preferable that the cover members 314 are formed of a metal material.

When the cover members 314 are formed of a magnetic material such as an iron or an aluminum, a magnetic flux may be generated in the cover members 314, and iron loss, or the like may be generated in the rotor 30. Thus, when the cover members 314 are formed of a metal material, it is preferable that, for example, a non-magnetic metal material such as a titanium, or an austenitic stainless steel (SUS 300 series) used. When the cover members 314 are formed of a metal material, it is preferable that a thickness of the cover members 314 is, for example, about several µm to several hundred µm.

When the cover members 314 are formed of a metal material, the ring-shape cover members 314 can be mounted to a predetermined position of the rotor body 31 by, for example, shrinkage fitting, freeze fitting, or the like, from the longitudinal direction (X direction) of the rotor body 31. Since an object of the cover members 314 is to prevent peeling off of the cut piece of the carbon fiber CF due to wind pressure, it is sufficient that the holding member 313 of a mounted portion is covered. That is, as long as the mounted portion can be prevented from being directly hit by wind, there is no need to make a pushing force (hereinafter, also referred to as a "compression force") toward an inside of the radial direction of the holding member 313 large. Particularly, it is sufficient that the cover members 314 are mounted to the rotor body 31 with the compression force of an extent of not deviating in the longitudinal direction (X direction) of the rotor 30 when the rotor 30 rotates.

The cover members 314 also can be formed of a resin in that case, since influence of swelling of oil described above is prevented, the cover members 314 are formed of a resin having oil resistance. Resins that can be used as the cover members 314 include, for example, a fluororesin, a silicone (SI) resin, a polypropylene (PP) resin, a polyacetal resin (PPM), a polyethylene terephthalate (PET) resin, and the like. When the cover members 314 are formed of a resin, it is preferable that a thickness of the cover members 314 is, for example about several µm to several hundred µm.

The cover members 314 formed of a resin can be mounted to the rotor body 31 by directly coating a surface of the holding member 313. Positions in which the cover members 314 formed of a resin are mounted to the rotor body 31 are the same as a case of the cover members 314 formed of a metal material (see FIG. 4) When the cover members 314 are formed of a resin, the cover members 314 may have two-layer configuration. For example, the entire holding member 313 is thinly coated with a resin as the first layer, and coating is performed so that only an original mounting position is thick in a film thickness as the second layer. In this case, a portion in which the first layer and the second layer overlap is substantially the cover members 314. Further, when the cover members 314 are formed of a resin, the resin is shaped to be a mesh shape, the cover members 314 may be mounted to a predetermined position of an outside surface of the holding member 313.

As described above, the rotor 30 of the present embodiment includes the cover members 314 that cover both end portions of the longitudinal direction D1 of the holding member 313. Thereby, since the cut piece of the exposed carbon fiber CF is hard to be directly hit by wind in both end portions of the longitudinal direction D1 of the holding member 313, the cut piece of the carbon fiber CF is hard to be peeled off by wind pressure. Accordingly, spreading of peeling off of the carbon fiber CF to the entire holding member 313, and peeling off of the holding member 313 from the rotor 30 can be prevented.

In the rotor 30 of the present embodiment, the cover members 314 are mounted only to both end portions of the longitudinal direction D1 of each holding member 313. Thus, a mounting work of the cover members 314 can be simplified as compared to when the cover members 314 are configured to cover the entire longitudinal direction D1 of the holding member 313.

In the rotor 30 of the present embodiment, the cover members 314 are formed of a metal material. Thereby, since the inside of the motor 1 is hard to be affected by swelling of oil, durability of the motor 1 can be further improved. In the rotor 30 of the present embodiment, since the cover members 314 are formed of a non-magnetic metal material, a magnetic flux is hard to flow in the cover members 314. Accordingly, the rotor 30 of the present embodiment can prevent decreasing of motor efficiency due to iron loss, or the like.

In the rotor 30 of the present embodiment, when the cover members 314 are formed of a resin having oil resistance, since proceeding of swelling of the cover members 314 with time passage can be delayed, the durability of the motor 1 can be improved. Even when the cover members 314 swells, peeling off of the cut piece of the carbon fiber CF (the holding member 313) can be prevented for a longer period. When the cover members 314 are formed of a resin having oil resistance, the cover members 314 can be mounted to the outer circumferential surface of the holding member 313, easier as compared to the metal cover members 314.

When the cover members 314 are formed of a resin having oil resistance, since a mass of the cover members 314 can be made small, influence on a rotation characteristic of the rotor 30 can be made smaller. When the cover members 314 are formed of a resin having oil resistance, since the cover members 314 are made thin, interval between the stator 20 and the rotor 30 (permanent magnets 312) can be made narrower.

The embodiments of the present invention are described above. The present invention is not limited to the embodiments described above, and can be performed with various modifications and changes as a modification described later, and those are included in a technical scope of the present invention. The effects described in the embodiments are only listing of the most preferable effects generated by the present invention, and the effects are not limited to those described in the embodiments. The embodiments described above and the modification described later may be used in combination as appropriate. However, detailed description thereof is omitted.

Modification

Figure 6:
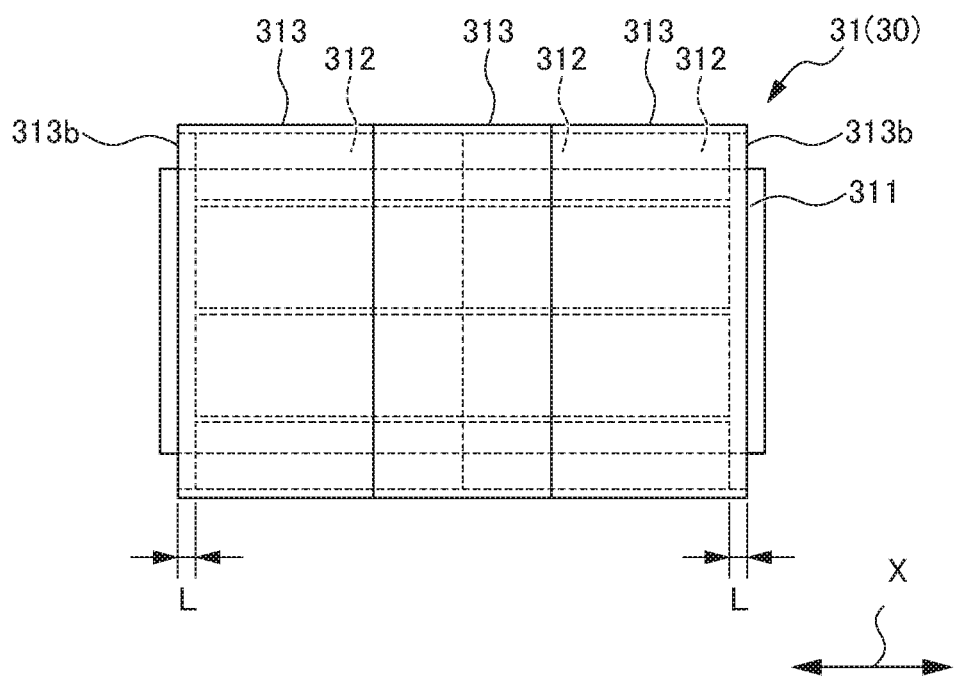
FIG. 6 is a side view showing a rotor 30 of a modification.

FIG. 6 is a side view showing the rotor body 31 of a modification. In FIG. 6, in order to make the shape of the holding member 313 easy to be understood, illustration of the cover members 314 is omitted. In description and drawing of the modification, a portion that exhibits a similar function to the embodiments described above is added with the same reference numeral, and redundant description is omitted as appropriate.

As shown in FIG. 6, in the holding member 313 of the modification, an end portion 313b of the longitudinal direction (X direction) of the rotor body 31 projects outward further than the permanent magnets 312. In the longitudinal direction of the rotor body 31, it is preferable that a length in which the end portion 313b of the holding member 313 projects outward from the end portion of the permanent magnets 312 is, for example, about 1 to 10 mm, depending on a size of the rotor body 31. When the length L is too long, the end portion of the holding member 313 becomes easy to flap by wind pressure. Thus, at is considered that peeling off of the carbon fiber CF in the end portion 313b of the holding member 313 proceeds. In this modification, the cover members 314 formed of a metal material or a resin having oil resistance described in the embodiments can be used. In this modification, positions in which the cover members 314 are mounted are the same as that in the embodiments (see FIG. 5).

According to this modification, since the end portion of the holding member 313 projects outward further than the permanent magnets 312, even when a warp is generated in the end portions of the permanent magnets 312 attached to the sleeve 311, the permanent magnets 312 can be tightly adhered to the sleeve 311, more reliably. Thereby, even when a warp is generated in the end portion of the permanent magnets 312, a contact area of the permanent magnets 312 and the sleeve 311 can be secured, a friction force between the permanent magnets 312 and the sleeve 311 can be increased. Thus, according to this modification, deviation of the permanent magnets 312 during rotation of the rotor 30 can be prevented. According to this modification, since the permanent magnets 312 are not exposed in the outside of the rotor 30, the permanent magnets 312 can be prevented from scattering outside of the radial direction by the centrifugal force generated by the rotation of the rotor 30.

As another modification, the cover members 314 formed of different materials may be mounted to the rotor body 31 of the embodiments. For example, in FIG. 5, the cover members 314 formed of a metal material may be mounted to the outside of the longitudinal direction (X direction) of the rotor body 31, while the cover members 314 formed of a resin having oil resistance may be mounted to the inside.

When the cover members 314 are formed of a resin having oil resistance, a position in which the cover members 314 are provided is not limited to the example of the embodiments. For example, the cover members 314 may be formed in a band shape along the longitudinal direction D1 (X direction) of the holding member 313 so that the entire end portion 313a (see FIG. 4) of a winding end of the holding member 313 is covered. The holding member 313 may be shaped by directly winding the fiber bundle F onto the outer circumferential surfaces of the permanent magnets 312 (the rotor 30), together with a resin, or may be shaped by directly winding the resin bundle F impregnated in a resin onto the outer circumferential surfaces of the permanent magnets 312.

The holding member 313 may be shaped by winding a rectangular fiber sheet (CFRP) onto a tubular jig together with a resin, or winding a rectangular fiber sheet impregnated in a resin onto a tubular jig. The holding member 313 may be shaped by winding a rectangular fiber sheet onto the outer circumferential surfaces of the permanent magnets 312, together with a resin, or directly winding a rectangular fiber sheet impregnated in a resin onto the outer circumferential surfaces of the permanent magnets 312. In the embodiments, as the rotary member composing the rotor 30, the rotary axis 32 is described as an example. However, the rotary member is not limited thereto. The rotary member may be the sleeve 311.

EXPLANATION OF REFERENCE NUMERALS

1: Motor, 20: Stator, 30: Rotor, 32: Rotary axis (rotary member), 311: Sleeve, 312: Permanent magnet, 313: Holding member, 314: Cover member, D1: Longitudinal direction of holding member, D2: Longitudinal direction of fiber bundle, F: Fiber bundle, CF: Carbon fiber

What is claimed is:

1. A rotor comprising:
   a rotary member;
   a plurality of permanent magnets disposed in an outer circumference of the rotary member;
   a holding member that is provided on an outer circumferential surface of the permanent magnets to hold the permanent magnets, the holding member having a cylindrical shape formed of a fiber reinforced plastic; and
   cover members that cover the holding member, wherein
   the holding member is divided into a plurality of holding members along a longitudinal direction of the rotary member,
   the cover members are provided on outer circumferential surfaces of both end portions in a longitudinal direction of the divided holding members and provided on outer circumferential surfaces of connection portions of the divided holding members, and
   each cover member is positioned to be separate from one another along the longitudinal direction of the holding members, and is not directly provided on the outer circumferential surface or a side surface of the permanent magnets.

2. The rotor according to claim 1, wherein a longitudinal direction of a fiber included in the fiber reinforced plastic crosses the longitudinal direction of the holding member.

3. The rotor according to claim 1, wherein the cover member is formed of a metal or a resin having oil resistance.

4. A rotary electric machine comprising:
   the rotor according to claim 1; and
   a stator provided in an outer circumferential side of the rotor.

* * * * *